(No Model.) 3 Sheets—Sheet 1.
A. W. BILLINGS.
APPARATUS FOR MAKING MALT LIQUORS.
No. 515,319. Patented Feb. 27, 1894.
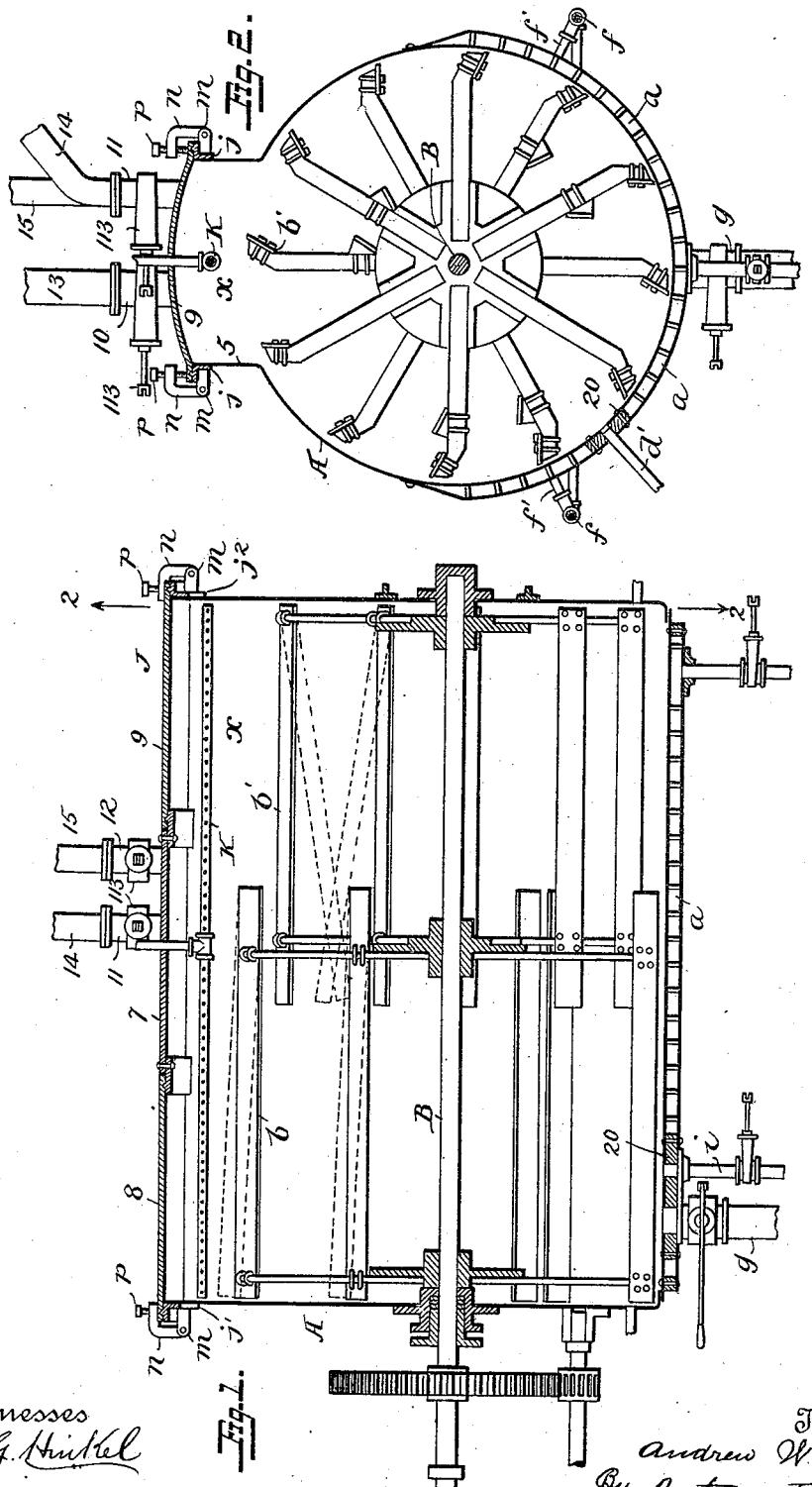
Witnesses
Jno. G. Hinkel
Alice N. Dobson
Inventor
Andrew W. Billings
By Foster & Freeman
Attorneys

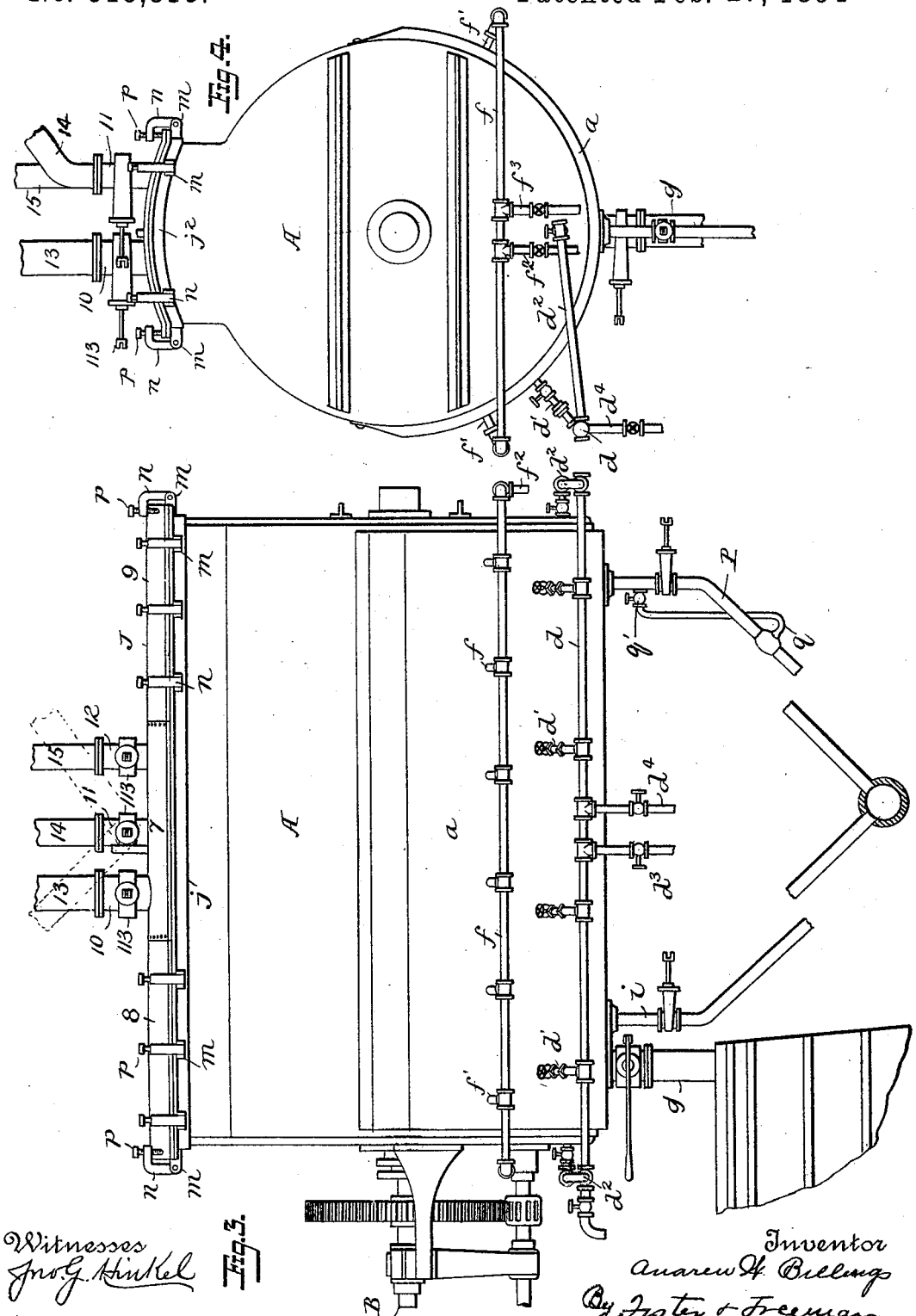

(No Model.) 3 Sheets—Sheet 3.

A. W. BILLINGS.
APPARATUS FOR MAKING MALT LIQUORS.

No. 515,319. Patented Feb. 27, 1894.

UNITED STATES PATENT OFFICE.

ANDREW W. BILLINGS, OF BROOKLYN, NEW YORK.

APPARATUS FOR MAKING MALT LIQUORS.

SPECIFICATION forming part of Letters Patent No. 515,319, dated February 27, 1894.

Application filed May 3, 1892. Serial No. 431,618. (No model.) Patented in England May 11, 1892, No. 8,952.

*To all whom it may concern:*

Be it known that I, ANDREW W. BILLINGS, a citizen of the United States, residing in Brooklyn, in the county of Kings and State of New York, have invented certain new and useful Improvements in Apparatus for Making Malt Liquors, (which has been patented in Great Britain, No. 8,952, dated May 11, 1892,) of which the following is a specification.

This invention relates to certain improvements in the apparatus used for making malt liquors as ale, beer, &c., by different processes, and said improvements will be set forth hereinafter and are illustrated in the accompanying drawings, in which—

Figure 5:
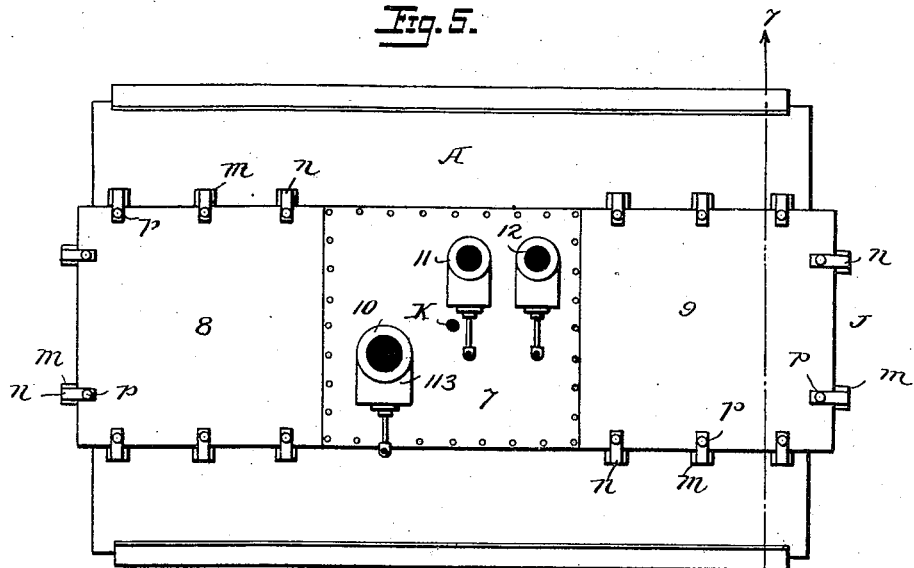
Figure 6:
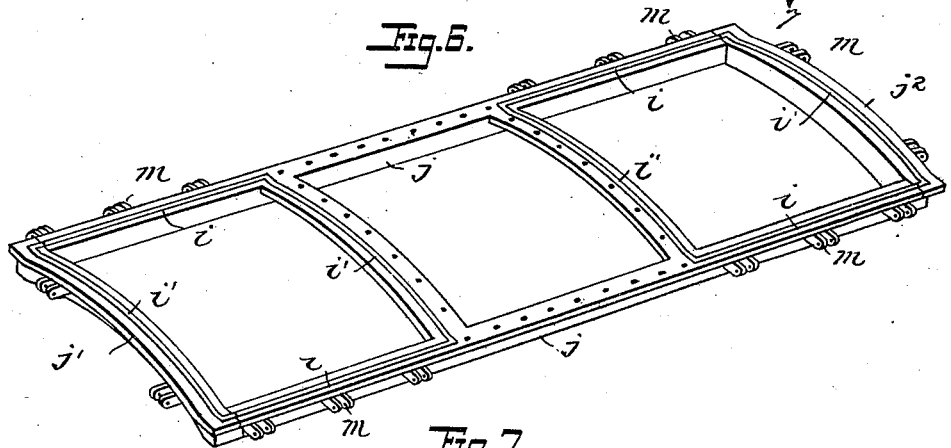
Figure 7:
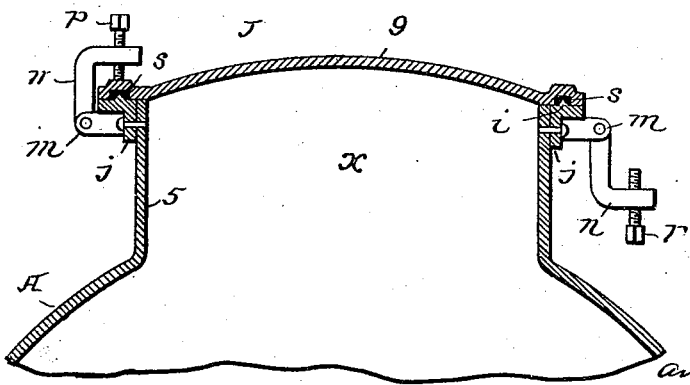

Figure 1, is a longitudinal sectional elevation of the improved apparatus. Fig. 2, is a transverse sectional elevation on the line 2—2, Fig. 1. Fig. 3, is a side elevation. Fig. 4, is an end elevation. Fig. 5, is a plan of the tank or casing. Fig. 6, a perspective view of the flange rim at the mouth of the casing. Fig. 7, is a section on the line 7—7, Fig. 5.

The first feature of improvement relates to the form of the tank shell or casing A. Heretofore the said shell or casing has been rounded at the bottom and with parallel sides above the line of the shaft B, of the revolving stirrer. As a consequence when the contents begin to boil the tendency is to rise up straight and to flow out through the opening at the top of the apparatus or over the top when it is not closed. Another objection to the old form is that when the stirrer revolves in a casing that has parallel sides above the center there is left at the sides near the top spaces containing material which is not acted upon by the stirrer so that this remains at these points as an inert mass not affected by the revolution of the blades of the stirrer, not mixed up and the material therein is not converted. To overcome these objections I so construct the casing that every portion therein will be subjected to the action of the stirrers. That is, I make the casing in the form of a horizontal cylinder with only a sufficient space or opening at the top to allow for manholes and the openings for the introduction of the material and the escape of the vapor. Different constructions may be employed for carrying out this feature, but as shown, the cylindrical casing A, has a longitudinal opening *x*, surrounded by a vertical flange 5, the whole being formed of boiler iron properly shaped and to said flange 5, is applied the cap or cover J. It is desirable in apparatus of this kind to use the same for either mashing, cooking or boiling and to this end it is sometimes desirable to have the casing open at the top and at other times to have it closed tightly so as to stand steam pressure. I therefore provide a cover which will stand the requisite pressure and which can be removed or put in place at pleasure. Such covers may be made in different ways, but as shown the cover is in three sections, the middle section 7, being bolted in place and the sections 8 and 9, being removable and provided with suitable packings and clamping devices.

The fixed section 7, of the cover, is provided with necks 10, 11, 12, each of which is formed into a casing for a slide valve 113, which serves to open or close the neck, the neck 10, communicating with the vapor pipe 13, the neck 11, with the grain pipe 14, and the neck 12, with the malt pipe 15 or there may be but a single neck 11, and the malt pipe 15, and grain pipe 14, may converge to the same neck as shown in dotted lines in Fig. 3 each being provided with a valve. By this means the necks and pipes and connections and valves that regulate the flow of the material into the casing and the escape of vapor occupy fixed positions and do not require to be shifted.

It is necessary to open the sections 8, 9, of the cover for the purpose of cleaning the interior of the casing and to admit light in inspecting and also to afford a free escape in boiling and to prevent pressure when it is not desired.

All the sections 7, 8, 9, are curved so as to maintain their proper shape under internal pressure and to provide proper seats and packings for the removable sections I provide the neck 5, with flanges and extend two crossbars or ribs across the opening *x*, for the edges of the removable sections to bear upon. These flanges may be formed upon the metal of the casing by flanging it outward as usual, but I prefer to use a series of cast metal flange pieces as I will now describe. There are straight cast metal L-shaped flange pieces *j*, each with a vertical flange for bolting to the side of the flange 5, and a horizontal flange having a rib $i$, for bearing against the packing of the removable section of the cover and there are arched flanged pieces $j'$, $j^2$, each with a rib $i'$, which when the parts are in place forms a continuation of the rib $i$, of the other flange pieces $j$. The side edges of the section 7, of the cover are riveted to the arched cross pieces $j'$, at one side of the ribs $i'$, thereof, and each of the sections 8, 9, is stamped up or otherwise formed with a recess or provided with other means for holding a packing $s$, which when the cover is in place bears upon the ribs $i$, $i'$, all around so as to effectually seal the opening in the case.

Any suitable means may be employed for clamping the detachable covers in place, I prefer, however, to cast upon each of the flanged pieces $j$, pairs of lugs $m$, between which is bolted, so as to swing freely a dog $n$, carrying a screw $p$. The dogs may all be swung to one position so as to bring the screws above the section of the cover when by turning the screws the said section may be forced down so as to effectually seal the joint or the screws may be turned so as to relax the pressure, permit the dogs to be swung outward and the sections to be detached. A water injecting pipe K, extends across the upper portion of the casing as heretofore so as to permit water to be thrown into the contents when required.

The casing is provided at the bottom with an external shelf or casing $a$, forming an intervening jacket for the admission of either water or steam as may be required.

It is very important that either steam or water as required may be injected into the interior of the casing, and that also either steam or water, as required, may be injected into the jacket, and for this reason I provide the pipes leading to these two different spaces with connections each with both a steam and a water pipe. Thus, the pipe $f$, extending around the casing is provided with branches $f'$, which communicate at both sides with the water jacket, the object in communicating at different points being to permit the water or steam to be simultaneously introduced at all portions of the jacket so that one side thereof shall not be colder or hotter than the other, which would materially affect the processes carried on by means of the apparatus. It is therefore necessary, in order that the effect of the water or steam shall be the same on both sides at the same time, to connect the water or steam pipe with the pipe $f$, at a central position between the ends thereof. Thus, as shown, the steam pipe $f^2$, communicates with the pipe $f$, at about the center thereof and the cold water pipe $f^3$, at near the same point, and each pipe $f^2$, $f^3$, is provided with a valve so that the steam or water may be passed into said pipe but will then be equally distributed. It is the same as regards the injection of water that flows into the tub, it is not necessary to distribute this along both sides of the casing and I therefore arrange the pipe $d$, to extend only at one side with branches $d'$, provided with cocks through the jacket and into the interior and with other branch pipes $d^2$, leading along the sides and to the end, these being arranged as near the bottom as possible so as to operate upon even a small quantity of material when it is not desired or required to operate upon a large quantity filling the entire casing. For the purpose of equally distributing the steam or water to both ends of the casing the cold water pipes $d^3$, and the steam pipe $d^4$, are placed so as to connect with the pipe $d$, near the center thereof, as shown in Fig. 3.

The material of which the casing is made is of course made as light as possible so as to avoid expense and weight, and for this reason it has been found difficult to connect the pipes $d'$, which extend through the shells so as to avoid leakage. To effect such connection I make use of intermediate blocks or filling pieces which I have found necessary to be of gun metal or some such composition, as the material of the shells expand and contract very rapidly and somewhat unequally owing to the differences in temperature of the injected fluids, and I bolt these filling pieces between the two shells by means of rivets 20, extending directly through the filling pieces and the shells and the inlet pipes are let into the bored openings as will be readily understood.

Heretofore the outlet pipe $g$, has been used for discharging the material from the casing into the mash tub and also for discharging the wash water. For this reason it has been necessary to wait until the mash tub is emptied before washing out the casing A, and as the said casing becomes cool the material cakes inside it and becomes extremely difficult to get it cleaned. To avoid this objection I provide the casing with a separate discharge pipe $i$, provided with a valve and leading to a sewer or other receptacle and when it is necessary to wash out the casing after the material has been discharged to the mash tub, I close the valve of the discharge pipe $g$, and then open the valve of the pipe $i$, and inject water through the pipes $d'$, into the casing and wash the same out immediately after the mash has been discharged so that in a few moments after the discharge of the mash the tub is clean and ready for further operation if desired. The importance of this will be understood from the fact that by this arrangement I am enabled as soon as the mash has been put into the mash tub and it begins to filter therein to pump the filtered material or wort right back into the casing A, because the latter has been immediately cleansed after the mash has been discharged.

It has been found that when the blades of the stirrer are continuous, extending from one end to the other and the material is introduced at the center, there is a tendency for it to remain in the center and not distribute equally through the opposite end. To prevent this I break each blade into two sections $b, b'$, as best illustrated in Figs. 1 and 2, and these sections may be inclined as shown in dotted lines, Fig. 1, and I have found that by this means side or longitudinal currents are created which tend to distribute the material very quickly through the water as soon as it is introduced and thereby also when the malt is introduced there is a very quick admixture of all the contents of the casing. When it is desired to cool down the material rapidly the steam is discharged from the surrounding jacket by the admission of water and to permit this to be done rapidly I provide a large discharge pipe P, communicating with a sewer or other proper receptacle and provided with a large valve which is opened whenever the steam has been discharged and the water introduced or the water discharged and steam introduced. It is necessary, however, from time to time to remove the water of condensation and for this reason I make use of a pipe $q$, formed into a trap and communicating with the pipe P, on opposite sides of the valve thereof and provided with a separate valve $q'$ which is open to the extent necessary to permit the water of condensation to flow out.

Without limiting myself to the precise construction and arrangement of parts shown, I claim—

1. A mashing apparatus having a horizontal cylindrical casing with a narrow opening $x$, at the top, surrounded by a vertical flange, with a fixed cover section, and removable side sections, with openings in the fixed section communicating with the vapor pipe and the inlet pipe for the material substantially as set forth.

2. In a mashing apparatus, the combination with the casing A, having the opening $x$ at the top surrounded by a vertical flange, 5, the L-shaped ribbed flange pieces $j$, secured to the said vertical flange 5, near its upper edge, the covered sections, and means for clamping the said sections to the flanges, $j$, substantially as set forth.

3. The combination of the casing provided with a central opening $x$ surrounded by a vertical flange, 5, the angular flange pieces $j, j', j^2$ secured to the said vertical flange 5, and surrounding the opening into the casing, the cross bars connecting the side flange pieces $j$, and crossing the opening into the casing, and the cover sections adapted to rest upon the said angular flange pieces and to be secured thereto, substantially as set forth.

4. In a mashing apparatus the combination of the casing A, the outer casing and intermediate chamber and intermediate filling blocks bolted or riveted to the two shells and the pipes projecting into and secured to the said filling blocks, substantially as set forth.

5. In a mashing apparatus the combination with the inner casing and its surrounding jacket, of a pipe communicating through branches with the inside of the inner casing, and water and steam pipes connected with said pipe about midway of its ends and provided with cocks, substantially as set forth.

6. In a mashing apparatus the combination with the casing and steam jacket, of pipes extending around the casing and communicating at different points with the steam jacket and water and steam pipes communicating with said pipe about midway between its ends, substantially as set forth.

7. In a mashing apparatus the combination of the casing the stirrer therein, the mash tub, the discharge pipe connecting the casing with the mash tub, a waste receptacle, an independent discharge pipe connecting the casing with the said waste receptacle, and the water pipes for flushing the said casing, substantially as set forth.

8. In a mashing apparatus the combination of the casing, surrounding jacket, pipes extending from said jacket to a fixed receptacle and provided with a valve, a drip pipe extending from the said pipe from a point above the valve to a point below the valve and the valve in the drip pipe substantially as described.

In testimony whereof I have signed my name to this specification in the presence of two subscribing witnesses.

ANDREW W. BILLINGS.

Witnesses:
ALLE N. DOBSON,
CHARLES E. GRAVES.